US012246551B2

(12) United States Patent
Hannig

(10) Patent No.: US 12,246,551 B2
(45) Date of Patent: Mar. 11, 2025

(54) DIGITAL PRINTING-STRUCTURED ANTIWEAR FILM HAVING ADJUSTABLE GLOSS LEVEL

(71) Applicant: AKZENTA PANEELE + PROFILE GMBH, Kaisersesch (DE)

(72) Inventor: Hans-Jürgen Hannig, Bergisch Gladbach (DE)

(73) Assignee: Akzenta Paneele + Profile GMBH, Kaisersesch (DE)

( * ) Notice: Subject to any disclaimer, the term of this patent is extended or adjusted under 35 U.S.C. 154(b) by 26 days.

(21) Appl. No.: 17/773,901

(22) PCT Filed: Dec. 11, 2020

(86) PCT No.: PCT/EP2020/085834
§ 371 (c)(1),
(2) Date: May 3, 2022

(87) PCT Pub. No.: WO2021/116447
PCT Pub. Date: Jun. 17, 2021

(65) Prior Publication Data

US 2022/0379649 A1 Dec. 1, 2022

(30) Foreign Application Priority Data

Dec. 12, 2019 (EP) .................................... 19215652

(51) Int. Cl.
*B41M 7/00* (2006.01)
*B05D 3/06* (2006.01)
(Continued)

(52) U.S. Cl.
CPC ........... *B41M 7/0027* (2013.01); *B05D 3/067* (2013.01); *B05D 5/12* (2013.01); *B41M 5/0047* (2013.01)

(58) Field of Classification Search
CPC ... B41M 7/0027; B41M 5/0047; B05D 3/067; B05D 5/12
(Continued)

(56) References Cited

U.S. PATENT DOCUMENTS 5,300,331 A * 4/1994 Schaeffer ............... B05D 3/067 427/393
2002/0067394 A1 * 6/2002 Yoshihiro ............ B41M 5/0047 347/45
(Continued)

FOREIGN PATENT DOCUMENTS

CN 106103127 A 11/2016
EP 2218520 A2 * 8/2010 ............. B05C 1/025
(Continued)

OTHER PUBLICATIONS

Method and Device for Producing a Structured Surface, EP 2218520 A2 (English Translation) (Year: 2010).*
(Continued)

*Primary Examiner* — Betelhem Shewareged
(74) *Attorney, Agent, or Firm* — Harness, Dickey & Pierce, P.L.C.

(57) ABSTRACT

The present disclosure proposes a process for producing a structured antiwear film, comprising the process steps of: a. providing a base antiwear film, b. applying a formable outer paint layer to at least part of the area of the base antiwear film, c. at least partially structuring the outer paint layer by means of a digital printing process to create a structuring of the outer paint layer, and d. curing the outer paint layer such that the outer paint layer is first partly cured, wherein UV radiation with a wavelength in a range from ≥150 nm to ≤250 nm is used for the partial curing, and wherein the outer paint layer is then cured to completion, and wherein e. the outer paint layer, before being supplied to the printing unit for partially structuring the outer paint layer and/or during
(Continued)

the printing operation for partially structuring the outer paint layer in the printing unit, is treated with means for changing the electrostatic charge of the outer layer, in that the outer layer is electrostatically discharged.

11 Claims, 1 Drawing Sheet

(51) Int. Cl.
*B05D 5/12* (2006.01)
*B41M 5/00* (2006.01)

(58) Field of Classification Search
USPC ........................................ 428/195.1; 427/493
See application file for complete search history.

(56) References Cited

U.S. PATENT DOCUMENTS

| | | | | |
|---|---|---|---|---|
| 2006/0128165 | A1* | 6/2006 | Theiss | G03F 7/2014 438/798 |
| 2007/0204545 | A1* | 9/2007 | Ovaert | E04F 15/22 52/389 |
| 2008/0136161 | A1* | 6/2008 | Leenders | B42D 25/00 283/94 |
| 2019/0366757 | A1 | 12/2019 | Hannig | |
| 2020/0016627 | A1 | 1/2020 | Pankoke | |
| 2020/0016629 | A1 | 1/2020 | Pankoke | |
| 2020/0023662 | A1 | 1/2020 | Pankoke | |
| 2020/0368777 | A1 | 11/2020 | Pankoke | |
| 2020/0406665 | A1 | 12/2020 | Hannig | |

FOREIGN PATENT DOCUMENTS

| | | | |
|---|---|---|---|
| EP | 3632700 | A1 | 4/2020 |
| WO | 2018130580 | A1 | 7/2018 |
| WO | 2018229170 | A1 | 12/2018 |

OTHER PUBLICATIONS

WO2018229170A1 English Translation (Year: 2018).*
First Office Action dated Feb. 8, 2023 from corresponding Chinese Patent Application No. 202080079684.2.
Office Action from corresponding European Patent Application No. 20821009.6, dated Dec. 21, 2023.
Office Action regarding Ukrainian Application No. a202202446, dated Feb. 26, 2024.
Notice of Grounds for Rejection regarding Korean Patent Application No. 10-2024-7016275, dated Jun. 20, 2024.

* cited by examiner

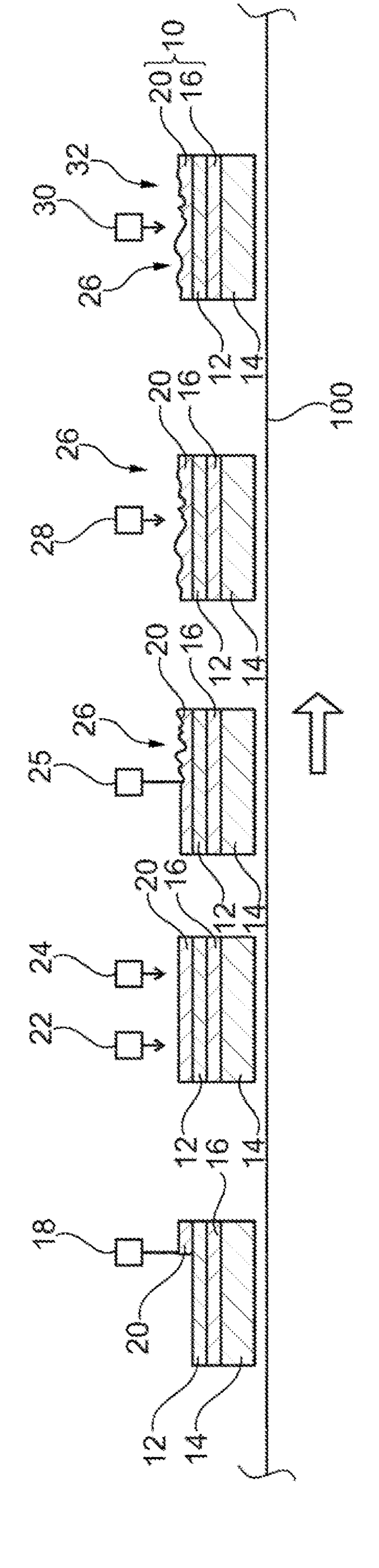
10
12
14
16
18
20
22
24
25
26
28
30
32
100

DIGITAL PRINTING-STRUCTURED ANTIWEAR FILM HAVING ADJUSTABLE GLOSS LEVEL

CROSS-REFERENCE TO RELATED APPLICATIONS

This application is a U.S. National Phase Application under 35 U.S.C. 371 of International Application No. PCT/EP2020/085834, filed on Dec. 11, 2020, which claims the benefit of European Patent Application No. 19215652.9, filed on Dec. 12, 2019. The entire disclosures of the above applications are incorporated herein by reference.

FIELD

The present disclosure relates to a method for producing a digital printing-structured antiwear film, in particular by negative structuring, with an adjustable gloss level. The present disclosure further relates to a structured antiwear film, the use of a structured antiwear film and a decorative panel comprising a structured antiwear film.

BACKGROUND

This section provides background information related to the present disclosure which is not necessarily prior art.

Structured surfaces for wear protection are known per se and will be used in particular for the protection of decorative panels.

In the sense of the present disclosure, the term decorative panel is understood to mean wall, ceiling, door or floor panels which comprise a decoration applied onto a carrier plate. Decorative panels are used in a variety of ways, both in the field of interior design of rooms and as decorative cladding of buildings, for example in exhibition stand construction. One of the most common fields of application of decorative panels is their use as a floor covering, for cladding ceilings, walls and doors. The decorative panels often have a decoration and a surface structure that is intended to imitate a natural material.

In order to protect the applied decorative layer, wear or top layers are usually applied above the decorative layer. In many cases, it is provided that a surface structure imitating a decorative layer is incorporated in such wear or cover layers, so that the surface of the decorative panel has a haptically perceptible structure, which is adapted in its shape and pattern to the applied decoration, in order to obtain a reproduction of a natural material as faithful as possible, also in terms of haptics.

When forming structured antiwear surfaces with lacquers, the structure is introduced in a known manner by embossing tools.

A disadvantage of such processes can be that it is difficult to form small and locally limited structures, such as pores. In addition, the precise alignment of the embossing tools relative to the decoration can cause problems. In addition, variations of the structure can only be realized at great expense and, for example, small production series are comparatively uneconomical, since embossing tools have to be manufactured and replaced for each series. A further disadvantage can be that considerable forces may be required for such structuring, which is why the structuring requires a stable subsurface and is therefore usually carried out directly on the decorative panel. This can lead in particular to limitations in process control.

The production of structured surfaces for wear protection can therefore still offer potential for improvement under certain circumstances.

SUMMARY

This section provides a general summary of the disclosure, and is not a comprehensive disclosure of its full scope or all of its features.

It is therefore the object of the present disclosure to provide improved means for structured surfaces for wear protection which at least partially overcome the problems known from the prior art.

The disclosure proposes a method for producing a structured antiwear film, comprising the method steps:

a. providing a base antiwear film,
b. applying a formable lacquer-containing top layer onto at least a partial area of the base antiwear film,
c. at least partially structuring the lacquer-containing top layer with a digital printing process to produce a structuring of the lacquer-containing top layer, and
d. curing the lacquer-containing top layer in such a way that the lacquer-containing top layer is first partially cured, wherein UV radiation with a wavelength in a range from 150 nm to 250 nm is used for partial curing, and wherein the lacquer-containing top layer is subsequently finally cured; and wherein
e. the lacquer-containing top layer is treated before being fed to the printing unit for partial structuring of the lacquer-containing top layer and/or during the printing process for partially structuring the lacquer-containing top layer in the printing unit by means for changing the electrostatic charge of the top layer by electrostatically discharging the top layer.

The method described above offers significant advantages over the so-lutions of the prior art.

Surprisingly, it has been shown that when a digital printing process is used to produce a structure in a formable lacquer-containing layer on an antiwear film, it is possible to obtain a particularly detailed structuring of the antiwear surface. It has also been shown that the structure can be aligned particularly easy in various ways relative to a decoration. In addition, an economical production of small series is enabled, since no embossing tools have to be manufactured, and limitations in process control are reduced, since no particularly stable subsurface is required.

In the sense of the disclosure, the term "structured antiwear film" is understood to mean a film that can be applied onto panels or other material, has haptically perceptible structures and offers protection against wear.

In the sense of the disclosure, the term "base antiwear film" is to be understood as a film which can be applied onto panels or other materials, does not have to comprise any particular structuring and can serve as a substrate for the application of structures.

In the sense of the disclosure, the term "formable" is understood to mean a material which is plastically deformable, i.e. which changes its shape when a force is applied. In this context the material may, for example, be liquid or solid. A formability of the lacquer-containing top layer can be enabled, for example, by suitably adjusting the viscosity of the lacquer-containing top layer.

In the sense of the disclosure, the term "digital printing process" is to be understood as a computer-controlled direct printing process.

In the sense of the disclosure, the term "curing" means that the formable material loses its formability. For example, a fluid formable material may be solidified. For example, a plastically deformable solid can be transformed into an elastically deformable solid by curing. Herein, during curing at least in certain areas or partial curing, the material may partially lose its formability, i.e. lose its formability at certain locations, for example at the surface. It can also be understood to mean that the formability is only reduced and the material does not become completely unformable. It can also be understood to mean complete curing or final curing.

A method described above for producing an antiwear film thus serves in particular to improve the production of structured surfaces for wear protection.

In detail, the provision of a base antiwear film provides a substrate on which structuring can take place. By applying a formable lacquer-containing layer onto at least a partial area of the base antiwear film, a structurable layer is provided which is held by the base antiwear film and can therefore be easily formable and can nevertheless be passed through the process together with the base antiwear film. By partially structuring the lacquer-containing top layer by use of a digital printing process for producing a structuring of the lacquer-containing top layer, a particularly detailed structuring of the lacquer-containing top layer can be obtained. Since no embossing tools need to be used in the digital printing process, the base antiwear film can provide sufficient stability for the structuring as a substrate. By subsequently curing the now structured lacquer-containing top layer, the introduced structure is fixed so that it remains essentially unchanged even when force is applied. The interaction of the components thus results in the above-mentioned advantages.

With regard to curing, according to which curing of the lacquer-containing top layer takes place in such a way that the lacquer-containing top layer is first partially cured, wherein UV radiation with a wavelength in a range from 150 nm to 250 nm is used for partial curing, and wherein the lacquer-containing top layer is then finally cured, significant advantages are offered.

Partial curing of the lacquer-containing top layer, which in particular comprises a UV-curable lacquer, by use of the preferably monochromatic radiation of a wavelength in the range from 150 nm to 250 nm, i.e. with very short-wave UV radiation, leads to a polymerization in the uppermost layer of the lacquer. A thin cured film is formed on the surface, since the penetration depth of the radiation is limited. Since the polymerization also causes volume shrinkage, which in turn manifests itself in surface folds of varying degrees, the surface-near film exhibits micro-folds, which leads to diffuse reflection of the light and thus to a matte surface.

To this end, the base antiwear film with the applied and structured lac-quer-containing top layer is preferably passed through a low-oxygen or oxygen-free chamber. This is done, for example, by supplying nitrogen to the area in which the lacquer-containing top layer is cured with the UV radiation.

Subsequently, a final curing of the lacquer-containing layer can be ef-fected by means of UV radiation with wavelengths that are preferably longer than that of the partial curing process. The result is a mechanically and chemically highly resistant and matte surface.

Thus, the process allows highly adaptable gloss levels to be set, in particular by partial curing in the abovementioned wavelength range. This is because, for example, the parameters of the partial curing allow the folding of the surface layer and thus the matting or the gloss levels to be set in a highly defined and reproducible manner. This thus permits an effective and well-definable adaptability of the gloss level of the protective layer.

Advantages of such a matting of the surface include, for example, the matting up to extremely low gloss levels without further matting agents, which can make the process simple and economical, while further allowing a high reproducibility.

Furthermore, an increased surface hardness is surprisingly obtained after complete curing compared to a normal one-step curing process. In addition to the high hardness, the protective layer obtained, moreover, offers other advantages, such as an increased chemical resistance, a good cleanliness during the use due to the "anti-fingerprint effect" as well as a very good scratch and abrasion resistance.

Finally, a pleasant haptics can be achieved and a good crosslinkability while achieving a homogeneous surface.

Exemplary parameters of the partial curing process include monochromatic wavelengths of, for example, 172 nm or 222 nm without being restricted thereto. Furthermore, a lamp power in a range of 10-25 W/cm and/or a dose rate of 10-30 mW/cm$^2$ may be advantageous. Possible line speeds of up to 100 m/min per emitter are possible.

Since ozone can be produced at such wavelengths, it can be advantageous to pre-cure the lacquer-containing layer in such a way that the surface does not, or only to a limited extent, come into contact with oxygen. Accordingly, a closed chamber with nitrogen feed can be used at least for partial curing. It is thus possible in principle for the lacquer layer to be present during partial curing in an atmosphere with a reduced oxygen content compared with normal ambient air, for example in an inert gas atmosphere, such as a nitrogen atmosphere. Preferably, the residual oxygen content in the set atmosphere is in a range between 10 ppm and 300 ppm, in particular between 100 ppm and 200 ppm. Surprisingly, it has been possible to achieve particularly good partial curing results with such a reduced oxygen content compared with ambient air.

In this way it can be advantageously achieved that a drying process is enabled with particularly short wavelengths. It can be achieved that the UV radiation is absorbed comparatively less. In addition, it can be achieved that the UV radiation does not cause any reactions in the air, such as the reaction to ozone. In addition, undesirable surface reactions can be avoided, resulting in a particularly stable surface.

In a further embodiment of the disclosure, it can be provided that directly after the at least partial structuring of the lacquer-containing top layer by use of a digital printing process, a fixing step is carried out in which the introduced structuring is fixed by means of irradiation at a wavelength in the range from 300 nm to 400 nm, preferably 390 nm to 400 nm, such as 395 nm, in order to prevent the generated structuring from diverging. Such a fixation can be carried out, for example, by means of LED emitters and thus, in particular, with low energy consumption.

Furthermore, it can be provided that after the fixing step and prior to the described partial curing process, the structured lacquer-containing top layer is first gelled by means of further irradiation at a wavelength in the range from 350 nm to 410 nm. The amount of energy introduced to gel the structured top layer is preferably greater, in particular significantly greater, than the energy introduced in the upstream fixing step. Particularly preferably, gelling can be carried out by use of a gallium emitter.

With regard to the final curing, it may be advantageous that this process is carried out by UV radiation of a wavelength in a range from >150 nm to 450 nm, preferably from 300 nm to 410 nm, wherein in the final curing process preferably a longer wavelength than in the partial curing process is used.

This advantageously achieves a particularly fast and uniform curing, which in turn can further positively influence the mechanical properties of the surface. In principle, it can be achieved in an advantageous manner that the surface is hard-ened to a particularly high degree. As a result, moreover, a particularly high chemical resistance can be achieved. In addition, it can be achieved that a good curing is also possible without photoinitiators or with only a small amount of photoinitiator. Furthermore, in this way curing with only a small amount of heat input can be enabled.

In particular, it can be provided that the lacquer-containing top layer is irradiated in the second curing step, or in the final curing process, with UV radiation from a radiation source with a power of 5 to 200 W/cm.

In this way it can be achieved in an advantageous way that only a small amount of heat is introduced into the lacquer-containing layer during curing. In this way, moreover, undesired deformations can be avoided and the lacquer-containing top layer can nevertheless be cured sufficiently well.

It may be provided that the curing starts less than 5 s, preferably less than 2 s, in particular less than 0.5 s after the structuring.

This advantageously ensures that the structuring does not change due to subsequent deliquescence prior to the curing process.

It may also be provided that the formable lacquer-containing top layer is pre-cured prior to structuring.

This advantageously allows the viscosity of the lacquer-containing layer to be adjusted. In this way, it is possible to produce the structuring particularly detailed. This can also be understood to mean that curing is initiated shortly before structuring, so that during structuring the structures formed reach a curing degree that is sufficient to prevent subsequent deliquescence prior to a final curing.

In that the lacquer-containing top layer, in particular with the base antiwear film, is treated with means for changing the electrostatic charge before being fed to the printing unit for partial structuring of the lacquer-containing top layer and/or during the printing process for partial structuring the lacquer-containing top layer in the printing unit by electrostatically discharging at least the lacquer-containing layer, the structuring can be further improved. This is because the presence of undesirable and, in particular, undefined charges on the lacquer-containing top layer can cause the printed material to be undesirably deflected, thus distorting the printed image. This would result in an undesired or undefined change in the structure. However, this can be significantly improved by electrostatic discharge, so that the desired structure can be formable highly accurate and reproducibly.

Particularly preferably, a defined amount of charge can subsequently be applied to the lacquer top layer after the electrostatic discharge. Surprisingly, it has been found that in this embodiment the occurrence of blurring or deviations of the produced structure from the target structure in the course of the production process can be further avoided. An undefined electrostatic charge potentially building up in the substrate to be printed in the course of the production process can lead to an undefined deflection of the printed material on its way from the print head to the surface to be printed. This effect occurs to varying degrees depending on the production speed and the material selected for the antiwear base film or the lacquer-containing top layer, so that it is assumed that the base antiwear film or the lacquer-containing top layer is electrostatically charged as a result of the transport within the production plant depending on its material, and that this charge is sufficient to cause the observed effect.

By setting a defined electrostatic charge of the base antiwear film or the lacquer-containing top layer, the undefined deflection of printed material due to an unpredictable electrostatic charge can be prevented. Surprisingly, it has been found that the printed image and thus the structure produced can be further improved compared to merely dissipating electrostatic charges.

Furthermore, by electrostatic loading after electrostatic discharging a particularly defined electrostatic charge can be achieved, since local peak charges can be prevented. Here, the type, i.e. positive or negative polarity, and amount of the charge introduced or applied can be selected depending on the material of the base antiwear film or the lacquer-containing top layer and/or the printing process and/or other factors.

For example, a discharge can be carried out in a range greater than or equal to 7 kV. Alternatively or additionally, it may be provided that the electrostatic charging is carried out in a range from greater than 0 kV to less than or equal to 15 kV. Surprisingly, it has been shown that in particular a discharge by an abovementioned amount of charge and/or a loading by an abovementioned amount of charge can lead to a particularly detailed structure.

It may further be provided that a device for dissipating electrostatic charges and/or a device for supplying electrostatic charges is designed as a bar which comprises a surface which extends essentially parallel to a surface of the base antiwear film or of the lacquer-containing top layer and is arranged in the direction of the base antiwear film. Essentially parallel can in particular mean a deviation or tolerance of ≤20% in particular ≤10%, for example ≤1%, of the distance of the surface of the bar from the surface of the lacquer-containing top layer. In principle, the bar can be aligned transversely to the direction of movement or production of the film and positioned above and/or below the discharged arrangement.

Alternatively or additionally, it can be provided that the device for dissipating electrostatic charges and/or supplying electrostatic charges comprises at least one roll, brush or lip made of a conductive material, which makes electrically conductive contact with the carrier at least in the region of the printing unit and which is connected to an electrical ground potential. The electrical ground potential can be provided, for example, by a grounding. The bar, roll, brush or lip is preferably formed, at least in the region of contact with the lacquer-containing top layer of a material with a conductivity of $\geq 1*10^3$ $Sm^{-1}$.

It may further be provided that it has an ionization device upstream of the printing unit, by means of which an ionized air jet is passed over the lacquer layer. It has been shown that exposure to ionized air is suitable for further reducing or in-creasing the occurrence of electrostatic charging of the carriers.

It may further be provided that the base antiwear film and/or the formable lacquer-containing top layer comprises an acrylate-based plastic composition, in particular a polyurethane-modified acrylate plastic composition. It is understood that in this case, the formable lacquer-containing top layer comprises the plastic composition in a still uncured form, so that the top layer is formable, and that the base antiwear film comprises the plastic composition in an at least partially cured form, so that it can serve as a substrate for the formable lacquer-containing top layer.

According to a further preferred embodiment of the disclosure, it may be provided that the base antiwear film comprises a plastic composition based on a polyolefin, alone or in a mixture with other polymers, in particular other polyolefins. In particular, it may be provided that the film of the base antiwear film consists of a corresponding polyolefin-based plastic. In this case, suitable polyolefins are polyethylene, polypropylene, polymethylpentene, polyisobutylene, polybutylene, or mixtures or copolymers thereof, such as polyethylene polypropylene copolymers. In particular, it may be provided that the film of the base antiwear film comprises an isotactic polypropylene and preferably consists thereof. Furthermore, it may be provided that the film of the base antiwear film comprises a cycloolefin copolymer (COC) and in particular consists of such a cycloolefin copolymer.

In this way it is advantageously achieved that the structured antiwear film is overall flexible and at the same time has particularly good protective properties, such as stability, scratch resistance, heat resistance, water resistance and the like.

In addition to the radical polymerization of the acrylate groups, the high-energy and short-wave UV radiation leads to additional crosslinkings of the monomers. This considerably increases the surface hardness.

Preferably, the plastic composition can comprise a dipropylene glycol diacrylate, preferably in an amount of >0 to 15 wt.-% based on the plastic composition, and a reaction product of pentaerythritol, epichlorohydrin and acrylic acid, preferably in an amount of 2 to 15 wt.-% based on the plastic composition.

Further preferably, the plastic composition may additionally comprise a catalyst preferably in an amount of 1 to 10 wt.-% based on the plastic composition. Preferably, the catalyst may be a tertiary ammonium salt, in particular a tertiary ammonium salt selected from the group consisting of tetrabutyl ammonium bromide, me-thyl trioctyl ammonium chloride, benzyl triethyl ammonium chloride, hexadecyl trime-thyl ammonium bromide, and mixtures thereof. In a particularly preferred embodiment of the disclosure, the catalyst may be tetrabutyl ammonium bromide.

Further preferably, the plastic composition may additionally comprise a photoinitiator, preferably in an amount of ≥0.1 to ≤2 wt.-% based on the plastic composition.

In this respect, the photoinitiator may be a phosphine oxide, preferably an aromatic phosphine oxide, in particular phenylbis(2,4,6-trimethylbenzoyl)-phosphine oxide.

According to a particularly preferred embodiment, the plastic composition may comprise acrylate resin in a concentration between ≥25 wt.-% and ≤50 wt.-%, dipropylene glycol diacrylate between ≥10 wt.-% and ≤25 wt. %, trimethylolpro-pane triacrylate (ethoxylated) between ≥1 wt.-% and ≤10 wt.-%, and triethylene glycol diacrylate between ≥1 wt.-% and ≤10 wt.-%.

In addition, the plastic composition may comprise customary ingredients such as fillers, auxiliaries, such as defoamers or rheological aids, or inert diluents.

In particular, it may be provided that the formable lacquer-containing top layer and the base antiwear film both have the same plastic composition. In this way, it can be ensured that the formable lacquer-containing top layer and the base antiwear film consist essentially of the same material after curing of the lacquer-containing top layer. Thus, for example, the optical impression of the structured antiwear film is improved, since the base antiwear film and the lacquer-containing top layer also have the same optical properties after curing and undesired light refraction between the two layers can thus be avoided.

It may further be provided that the base antiwear film and/or the formable lacquer-containing top layer comprise hard materials, preferably in an amount between ≥5 wt.-% and ≥40 wt.-%, wherein the hard materials preferably have an average grain diameter between 10 μm and 250 μm.

In the sense of the disclosure, the term "hard materials" is understood to mean materials which have a sufficient hardness. For example, the hard materials may have a Mohs hardness of at least 8, preferably at least 9. Examples of suitable hard materials are titanium nitride, titanium carbide, silicon nitride, silicon carbide, bo-ron carbide, tungsten carbide, tantalum carbide, aluminum oxide (corundum), zirconium oxide, zirconium nitride or mixtures thereof.

In this way it is advantageously achieved that the structured antiwear film can be particularly abrasion-resistant. Hard materials in the base antiwear film provide abrasion protection over the entire surface of the structured antiwear film. Hard materials in the formable lacquer-containing top layer enable abrasion protection of the structure after curing of the lacquer-containing top layer. In this way it may be achieved that the structure is less blunted by stress.

It may further be provided that the formable lacquer-containing top layer has a thickness from ≥1 μm to ≤5 mm, preferably from ≥10 μm to ≤200 μm, in particular from ≥50 μm to ≤60 μm. Here, it may be provided that the lacquer-containing top layer is applied in an application quantity of ≥50 g/m$^2$ to ≤100 g/m$^2$, preferably ≥60 g/m$^2$ to ≤80 g/m$^2$, for example 70 g/m$^2$.

In this way it is advantageously achieved that a sufficiently deep structure can be produced, so that a particularly good haptic impression can be achieved. In addition, it is advantageously achieved that curing can take place sufficiently quickly so that the structure is not altered by any deliquescence of the formable top layer.

It may further be provided that the formable lacquer-containing layer comprises a material which is curable by electromagnetic radiation, in particular a material curable by UV radiation and/or IR radiation, particularly preferably a material curable by UV radiation.

In this way it is advantageously achieved that the curing can take place in a particularly quick and locally targeted manner. According to the disclosure, a material curable by electromagnetic radiation is understood to mean a material in which a chemical reaction can be initiated by electromagnetic radiation, whereby the material becomes harder. For example, this chemical reaction may be a polymerization or a crosslinking reaction.

In one embodiment of the disclosure, it may be provided that the partial structuring of the lacquer-containing top layer is carried out by spraying on a displacement ink by use of an inkjet process in a digital printing process.

According to the disclosure, the term "spraying on" is understood to mean that a material is applied as an aerosol jet in the form of particles and/or drops onto a subsurface. According to the disclosure the term "displacement ink" is understood to mean an ink, for example a liquid, solution or suspension, which partially displaces a formable material when impinging thereon. According to the disclosure, the term "inkjet process" refers to a process in which an ink is applied in a matrix via one or more nozzles.

In this way, it is advantageously achieved that the formable lacquer-containing top layer is structured by the impact of the displacement ink. At the points where the ink impinges, the impact of a droplet or particle can create depressions such as craters or valleys, at the bottom of which the ink remains. In addition, the displacement during the formation of the depression can create a wall around the depression, which is an elevation. Thus, by use of a displacement ink, a method of negative structuring may be applied.

In one embodiment of the disclosure, it may be provided that the displacement ink consists essentially of an ink composition selected from the group consisting of acrylate-based plastic, polyurethane-modified acrylate plastic, water, organic solvent, or mixtures thereof. Thus, it can be achieved in an advantageously way that the displacement ink is readily sprayable on the one hand and has good displacement properties on the other hand.

In a preferred embodiment of the disclosure, it may be provided that the ink composition comprises an ethoxyethyl acrylate, preferably 2-(2-ethoxyethoxy)-eth-ylene acrylate, preferably in an amount from ≥20 to ≤40 wt.-%, based on the ink composition. Additionally, it may be provided that the ink composition comprises an ethoxylated polyol esterified with acrylic acid, preferably 1,1,1-trimethylol propanethoxylate triacrylate, preferably in an amount from ≥20 to ≤40 wt.-%, based on the ink composition. In addition, it may be provided that the ink composition comprises a urethane acrylate, preferably in an amount from ≥10 to ≤20 wt.-%, based on the ink composition. Additionally, it may be provided that the ink composition comprises pentaerythritol acrylic ester, preferably in an amount from ≥5 to ≤10 wt.-%, based on the ink composition. It may further be provided that the ink composition comprises amine-modified acrylic oligomers, in particular reaction products of tripropylene glycol diacrylate with diethylamine, preferably in an amount from ≥5 to ≤10 wt.-%, based on the ink composition.

It may further be provided that the displacement ink is cured and cross-linked with the lacquer-containing top layer during curing of the lacquer-containing top layer. In this way it is advantageously achieved that a particularly stable structuring can be produced, since the displacement ink bonds with the lacquer-containing top layer.

It can further be provided that the displacement ink is evaporated during curing of the lacquer-containing top layer. In this way it is advantageously achieved that particularly deep structures are produced, since the displacement ink applied is removed again from the depressions.

Preferably, it may be provided that at least one of a droplet velocity, a droplet volume and a position of the sprayed on displacement ink are varied according to a three-dimensional digital template. By varying and controlling the droplet velocity, it can advantageously be achieved that structures with different depths are produced. Moreover, it is achieved that structures with different wall sharpness are produced. That is, it can be in particular varied whether the structure has sharp or blunt edges. Also by varying the droplet volume, the depth of the structure can be varied. In addition, in particular the width of depressions can be varied. By varying the position, it is possible to set where depressions and elevations are located. Thus, an overall complete control over the structuring is achieved, so that a desired structure can be produced according to a three-dimensional digital template. According to the disclosure, the term "three-dimensional digital template" is understood to mean a template which reproduces a structure in three dimensions, wherein the template can be stored on a digital medium, for example in the form of a CAD model.

Furthermore, it can be provided that the digital template is produced on the basis of a decoration, wherein the digital template provides complementary depressions and elevations corresponding to the haptics of the decoration. In this way, it is advantageously achieved that the haptic perception of the antiwear film corresponds to the visual perception of a decoration, so that a decorative panel, for example, makes a particularly high-quality overall impression.

Further advantageously, it may be provided that the method additionally comprises the method steps:

f. providing a carrier comprising a decoration on at least a partial area of the carrier, and g. applying the base antiwear film onto the decoration, wherein the application of the base antiwear film onto the decoration is carried out prior to the application, structuring and at least partial curing of the lacquer-containing top layer, wherein the structuring of the lacquer-containing top layer is preferably produced at least partially synchronously with the decoration.

In this way it is advantageously achieved that the structuring can be applied directly synchronously with a decoration. For example, based on alignment marks the structuring can be aligned directly in the digital printing process in such a way that the structuring is produced synchronously with the decoration.

A "carrier" can be understood in particular as a layer serving as a core or base layer in a finished panel, which can in particular comprise a natural material, such as a wood-based material, a fiber material or a material comprising a plastic. For example, the carrier can impart a suitable stability to a panel or contribute thereto. In particular, the carrier may be a web-like carrier or a plate-like carrier.

Particularly preferably, the carrier may comprise a material comprising a plastic. Plastics which can be used in the manufacture of corresponding panels or the carriers are, for example, thermoplastics such as polyvinyl chloride, polyolefins (e.g. polyethylene (PE), polypropylene (PP)), polyamides (PA), polyurethanes (PU), poly-styrene (PS), acrylonitrile butadiene styrene (ABS), polymethyl methacrylate (PMMA), polycarbonate (PC), polyethylene terephthalate (PET), polyether ether ketone (PEEK) or mixtures or copolymerisates thereof. The plastics may contain common fillers, for example calcium carbonate (chalk), aluminum oxide, silica gel, quartz flour, wood flour, gypsum. They may also be colored in a known manner. Preferably, the carrier may comprise talc as a filler material.

A decoration may be applied onto the carrier, for example, by a printing process. In this case, furthermore, a suitable printing subsurface may be provided on the carrier. Alternatively, it is not excluded in the sense of the present disclosure that the decoration is applied in such a way that, for example, an already printed fiber layer, such as a paper layer, or also an already printed film, such as of polyethylene, polypropylene or polyvinyl chloride, is applied onto the carrier, or that the fiber layer or the film is printed on the carrier.

The decoration may further be provided with a lacquer-containing layer which is located between the base antiwear film and the decoration after application of the base antiwear film.

With respect to further advantages or features of the method, reference is made to the description of the antiwear film, the use, the decorative panel and the figure.

The disclosure further proposes a structured antiwear film.

In detail, a structured antiwear film is provided, preferably produced by the method according to the disclosure, comprising a base antiwear film which in-cludes a lacquer-containing top layer applied and fixed to at least a partial area of the base antiwear film, wherein the lacquer-containing top layer has structures produced by the digital printing process.

By use of such an antiwear film it can be achieved that a material to be protected is protected from wear. Here, the film may already be applied onto a material to be protected or may be present individually. Advantageously, it is achieved that the film can be applied flexibly onto a material to be protected, for example in contrast to an exclusively directly applied antiwear layer. In this way such a film can advantageously also be produced independently of the material to be protected.

Furthermore, such an antiwear film can be produced without any problems and very adaptably with an adjustable gloss level or an adjustable matting.

With regard to further advantages or features of the antiwear film, reference is made to the description of the method, the use, the decorative panel and the figure.

The disclosure also proposes the use of a structured antiwear film according to the disclosure. In detail, the use of a structured antiwear film for protecting a decorative panel is provided, wherein the decorative panel comprises a carrier and a decoration on at least a partial area of the carrier and the structured antiwear film is applied onto the decoration, wherein during the application of the structured antiwear film the structuring of the lacquer-containing top layer is aligned at least partially synchronously with the decoration. This means that the structured antiwear film is applied onto a decorative panel only after manufacturing. The at least partially synchronous alignment of the structuring of the antiwear film with the decoration can be realized, for example, by use of alignment marks.

The use according to the disclosure advantageously achieves that the production of protected decorative panels has a greater flexibility. Due to the subsequent application of the structured antiwear film according to the disclosure it is also prevented that the panel is deformed due to possible shrinkage during the curing of antiwear layers directly on the panel.

With regard to further advantages or features of use, reference is made to the description of the antiwear film, the method, the decorative panel and the figure.

The disclosure further proposes a decorative panel comprising a structured antiwear film.

In detail, a decorative panel comprising a structured antiwear film is provided, wherein the decorative panel comprises a carrier with a decoration applied onto at least a partial area and a structured antiwear film according to the disclosure applied onto the decoration, and wherein the structuring of the structured antiwear film is synchronous with the decoration at least in partial areas. Furthermore, a suitable printing subsurface may be provided between the carrier and the decoration. The decoration can also be provided with a lacquer-containing layer which is located between the antiwear film and the decoration.

In this way, it can be achieved that the decorative panel is well protected against wear and at the same time comprises a particularly detailed structuring, the haptic perception of which corresponds to the visual perception of a decoration, so that a particularly high-quality overall impression is obtained.

Furthermore, such a decorative panel can be produced without any problems and very adaptably with an adjustable gloss level or an adjustable matting.

With regard to further advantages or features of the decorative panel, reference is made to the description of the antiwear film, the method, the use and the figure.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The disclosure is explained in more detail below with reference to a figure.

FIG. 1 shows the process sequence of a method according to the disclosure for producing a structured antiwear film in the course of production of a decorative panel 32.

DETAILED DESCRIPTION

Example embodiments will now be described more fully with reference to the accompanying drawings.

First, a base antiwear film 12 is provided. In the embodiment according to FIG. 1, this is arranged on a carrier 14 and, more precisely, on a decorative layer or a decoration 16 of the carrier 14. The carrier is arranged on a conveying device 100 which moves the carrier 14 in the direction of the arrow.

Further, an application unit 18 is shown, which applies a formable lac-quer-containing top layer onto at least a partial area of the base antiwear film 12. It may be provided that the base antiwear film 12 and/or the formable lacquer-containing top layer comprises an acrylate-based plastic composition, in particular a polyure-thane-modified acrylate plastic composition. Alternatively or in addition it may be provided that the base antiwear film 12 and/or the formable lacquer-containing top layer comprises hard materials, preferably in an amount between 5 wt.-% and 40 wt.-%, wherein the hard materials preferably have an average grain diameter between 10 μm and 250 μm. According to a further embodiment, the base antiwear film 12 can comprise at least one polymer selected from the group consisting of polyethylene, polypropylene, polymethylpentene, polyisobutylene, polybutylene and cycloolefin copolymers, or copolymers or mixtures of the aforementioned components.

Moreover, a device 22 for dissipating electrostatic charges from the top layer 20 is provided, which may contact the top layer 20 or operate contactless, and a device 24 for supplying electrostatic charges to the top layer 20 and disposed behind the device 22 for dissipating electrostatic charges from the top layer 20 is provided, which device can also contact the top layer 20 or operate contactless. Here, it may be preferred that a discharging is carried out in a range greater than or equal to 7 kV and/or that the electrostatic charging is carried out in a range greater than 0 kV to less than or equal to 15 kV.

Downstream of the device 24 for supplying electrostatic charges to the top layer 20, the carrier 14 is guided into a printing unit in which the lacquer-containing top layer 20 is structured by use of a digital printing process for producing a structuring 26 of the lacquer-containing top layer 20. In detail, it is provided that the at least partial structuring of the lacquer-containing top layer 20 is carried out by use of a digital printing process by spraying on a displacement ink by use of an inkjet process, in particular wherein at least one of a droplet speed, a droplet volume and a position of the sprayed-on displacement ink are varied according to a three-dimensional digital template. In this regard, the digital template may be generated based on the decoration, wherein the digital template provides complementary depressions and elevations corresponding to the haptics of the decoration.

Particularly preferably, the displacement ink consists essentially of an ink composition selected from the group consisting of acrylate-based plastic, polyurethane-modified acrylate plastic, water, organic solvent, or mixtures thereof.

After the structuring 26 is incorporated into the top layer 20, the lacquer-containing structured top layer 20 can be cured. This is done in particular in such a way that the lacquer-containing top layer 20 is first partially cured by a first radiation source 28, wherein UV radiation having a wavelength in a range from ≥150 nm to ≤250 nm is used for partial curing, and wherein the partially cured lacquer-containing top layer 20 is then finally cured by a second radiation source 30.

With regard to the curing process, it may be provided that monochromatic UV radiation with a wavelength in a range of 172 or 222 nm is used for partial curing and/or that radiation with a wavelength in a range from >150 nm to ≤450 nm, preferably from ≥300 nm to ≤410 nm is used.

At least the partial curing can be realized in such a way that the top layer 20 in the area of the treatment with the UV radiation is present in an atmosphere comprising an oxygen content reduced with respect to ambient conditions, for example in an inert gas atmosphere.

After the curing of the top layer 20, the antiwear film, in particular comprising the base antiwear film 12 and the structured cured top layer 20, may be finished. It should be noted that the method by use of a base antiwear film 12 on a carrier 14 is only exemplary and the carrier 14 is not mandatory, so that the base antiwear film 12 can also be arranged directly on the conveying device 100.

According to a further embodiment of the disclosure, it may be provided that directly after the at least partial structuring of the lacquer-containing top layer by use of a digital printing process by means of a printing unit, a fixing step is carried out in which the introduced structuring is fixed by irradiation at a wavelength in the range from 350 nm to 410 nm, such as 395 nm. Such fixing can preferably be carried out by means of LED emitters and thus, in particular, with low energy consumption.

Subsequently, after the fixing step and prior to partial curing by means of the radiation source 28, it may be provided that the structured lacquer-containing layer is initially gelled by means of further irradiation at a wavelength in the range from 350 nm to 410 nm. In this case, the amount of energy introduced for gelling the structured top layer is preferably greater, in particular significantly greater, than the amount of energy introduced in the upstream fixing step and can be carried out, for example, by using a gallium emitter.

The foregoing description of the embodiments has been provided for purposes of illustration and description. It is not intended to be exhaustive or to limit the disclosure. Individual elements or features of a particular embodiment are generally not limited to that particular embodiment, but, where applicable, are inter-changeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. A method of producing a structured antiwear film, comprising:

a. providing a base antiwear film;

b. applying a formable lacquer-containing top layer onto at least a partial area of the base antiwear film;

c. at least partial structuring of the lacquer-containing top layer by use of a digital printing process in order to produce a structuring of the lacquer-containing top layer; wherein the at least partial structuring of the lacquer-containing top layer is carried out by use of a digital printing process by spraying on a displacement ink by use of an ink-jet process and d. curing the lacquer-containing top layer in two separate curing steps in such a way that the lacquer-containing top layer is first partially cured, wherein UV radiation having a wavelength in a range from ≥150 nm to ≤250 nm at a lamp power in a range of 10-25 W/cm is used for the partial curing, and wherein the lacquer-containing top layer is subsequently finally cured by using UV radiation having a wavelength in a range from >150 nm to ≤450 nm at a lamp power in a range of 5 to 200 W/cm, and wherein the wavelength of the UV radiation used for final curing is longer than the wavelength of the UV radiation used for the partial curing, and wherein the lamp power used in the final curing step is higher than the lamp power used in the partial curing step, and wherein e. the lacquer-containing top layer is treated before being fed to the printing unit for partial structuring of the lacquer-containing top layer and/or during the printing process for partial structuring of the lacquer-containing top layer in the printing unit by means for changing the electrostatic charge of the top layer by electrostatically discharging the top layer.

2. The method according to claim 1, wherein the base antiwear film and/or the formable lacquer-containing top layer comprises an acrylate-based plastic composition.

3. The method according to claim 1, wherein the base antiwear film and/or the moldable lacquer-containing top layer comprises hard materials in an amount between ≥5 wt.-% and ≤40 wt.-%, wherein the hard materials have an average grain diameter between ≥10 μm and ≤250 μm.

4. The method according to claim 1, wherein the formable lacquer-containing top layer comprises a material curable by electromagnetic radiation.

5. The method according to claim 1, wherein at least one of a droplet speed, a droplet volume and a position of the sprayed on displacement ink are varied according to a three-dimensional digital template.

6. The method according to claim 5, wherein the digital template is generated based on a decoration, wherein the digital template provides complementary depressions and elevations corresponding to the haptics of the decoration.

7. The method according to claim 5, wherein the displacement ink consists essentially of an ink composition selected from the group consisting of acrylate-based plastic, polyurethane-modified acrylate plastic, water, organic solvent, or mixtures thereof.

8. The method according to claim 1, wherein monochromatic UV radiation having a wavelength in a range of 172 or 222 nm is used for partial curing.

9. The method according to claim 1, wherein a defined amount of charge is supplied to the lacquer-containing top layer subsequently to the electrostatic discharge.

10. The method according to claim 1, wherein an electrostatic discharge is carried out in a range of greater than or equal to 7 kV and/or wherein the electrostatic charging is carried out in a range of greater than 0 kV to less than or equal to 15 kV.

11. The method according to claim 1, further comprising:

f. providing a carrier comprising a decoration on at least a partial area of the carrier; and g. applying the base antiwear film onto the decoration, wherein the application of the base antiwear film onto the decoration is carried out prior to the application, structuring and at least partial curing of the lacquer-containing top layer, wherein the structuring of the lacquer-containing top layer is produced at least partially synchronously with the decoration.

* * * * *